US012639301B2

(12) United States Patent
Cao et al.

(10) Patent No.: US 12,639,301 B2
(45) Date of Patent: May 26, 2026

(54) DATA READING METHOD AND DEVICE FOR DATABASE, AND STORAGE MEDIUM

(71) Applicant: Beijing Volcano Engine Technology Co., Ltd., Beijing (CN)

(72) Inventors: Jianhua Cao, Beijing (CN); Heng Chen, Beijing (CN); Rui Shi, Beijing (CN); Jianjun Chen, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/789,663

(22) Filed: Jul. 30, 2024

(65) Prior Publication Data

US 2025/0077514 A1      Mar. 6, 2025

(30) Foreign Application Priority Data

Aug. 30, 2023    (CN) .......................... 202311110545.3

(51) Int. Cl.
*G06F 16/2453* (2019.01)
*G06F 16/22* (2019.01)

(52) U.S. Cl.
CPC .... *G06F 16/24537* (2019.01); *G06F 16/2246* (2019.01)

(58) Field of Classification Search
CPC .......... G06F 16/24537; G06F 16/2246; G06F 16/2455; G06F 16/2282; G06F 16/2456; Y02D 10/00
See application file for complete search history.

(56) References Cited

U.S. PATENT DOCUMENTS 6,748,377 B1 *   6/2004   Attaluri ............ G06F 16/24528
                                                          707/999.005
2003/0212670 A1    11/2003   Yalamanchi et al.
(Continued)

FOREIGN PATENT DOCUMENTS

CN          102479255 A      5/2012
CN          108304499 A   *  7/2018    ....... G06F 16/24549
(Continued)

OTHER PUBLICATIONS

China Patent Application No. 202311110545.3; Office Action; dated Jun. 7, 2025; 14 pages.

*Primary Examiner* — Khanh B Pham
*Assistant Examiner* — Kweku William Halm
(74) *Attorney, Agent, or Firm* — BakerHostetler

(57)          ABSTRACT

The present disclosure provides a data reading method and device for a database and storage medium, which includes: receiving a query condition for a Value column in an LSM-Tree database; querying first alternative data with Value meeting the query condition from the LSM-Tree database; constructing a right table according to Key of the first alternative data, taking total data in the LSM-Tree database as a left table, and carrying out Semi Join based on the left table and the right table, so as to acquire second alternative data matched with each Key of the right table from the left table; querying target data with Value meeting the query condition from the second alternative data. The present disclosure can realize a predicate pushdown function of an LSM-Tree database in Merge-On-Read scene, in which, a large amount of data scanning is avoided while write performance and query performance are balanced.

18 Claims, 3 Drawing Sheets

(56)  References Cited

U.S. PATENT DOCUMENTS

| 2014/0067789 A1 | 3/2014 | Ahmed et al. |
| 2017/0031976 A1* | 2/2017 | Chavan ............... G06F 16/2393 |
| 2018/0081946 A1* | 3/2018 | Bondalapati ........ G06F 16/2456 |
| 2018/0276277 A1 | 9/2018 | Wang et al. |
| 2019/0057133 A1 | 2/2019 | Chainani et al. |
| 2020/0341981 A1* | 10/2020 | Fender .............. G06F 16/24544 |
| 2024/0378202 A1* | 11/2024 | Chen ................. G06F 16/24547 |

FOREIGN PATENT DOCUMENTS

| CN | 108304499 B | 6/2021 |
| CN | 113868230 A | 12/2021 |

* cited by examiner

Receiving a query condition for a Value column in an LSM-Tree database    $\sim$ S201

Querying first alternative data with Value meeting the query condition from the LSM-Tree database    $\sim$ S202

Constructing a right table according to Key of the first alternative data, taking the total data in the LSM-Tree database as a left table, and carrying out Semi Join based on the left table and the right table, so as to acquire second alternative data matched with each Key of the right table from the left table    $\sim$ S203

Querying target data with Value meeting the query condition from the second alternative data    $\sim$ S204

Fig. 2

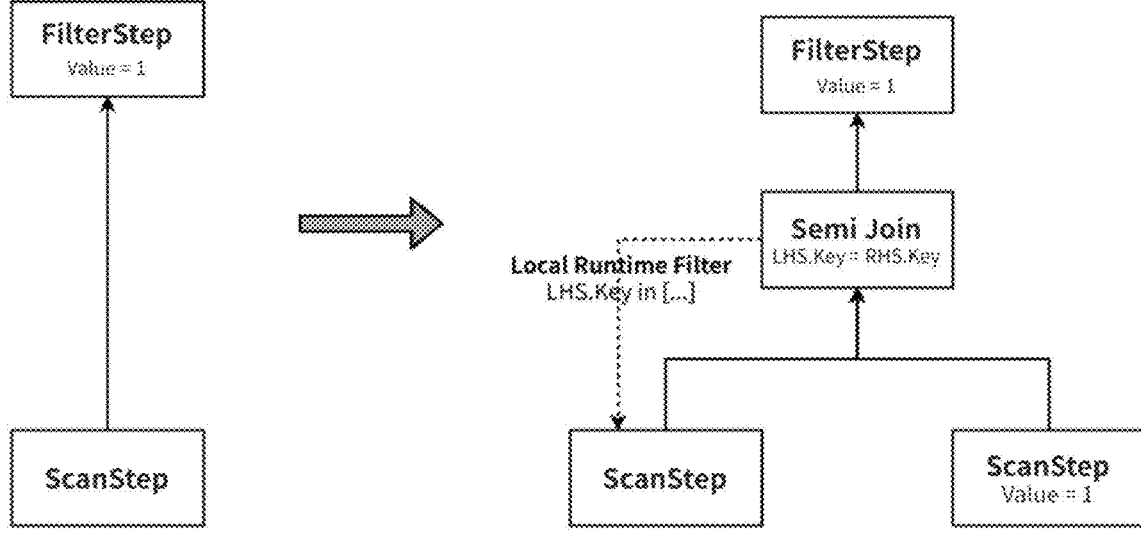

Fig. 3

DATA READING METHOD AND DEVICE FOR DATABASE, AND STORAGE MEDIUM

CROSS-REFERENCE TO RELATED APPLICATIONS

This application claims the priority to and benefits of the Chinese Patent Application, No. 202311110545.3, which was filed on Aug. 30, 2023. The aforementioned patent application is hereby incorporated by reference in its entirety.

TECHNICAL FIELD

Embodiments of the present disclosure relate to the technical field of computers and network communication, and particularly relate to a data reading method and device for a database, and a storage medium.

BACKGROUND

The log-structured merge-tree (LSM-Tree) database is a database based on a hierarchical, ordered, and disk-based data structure, and a Key-Value structure is subjected to data storage through Key value. In some multi-dimensional analysis scenes, users are more concerned about how to ensure the uniqueness of Key, and most LSM-Tree databases will provide a Unique table model to support such requirement. This type of table model requires the users to specify a Key column and a Value column when creating a table, and an engine will use an Merge-On-Read manner to merge the data with the same Key into a row when finally reading the data, and replace the Value in the previously written data with the Value in the data written in the next batch.

For the LSM-Tree database, it is difficult to push down Predicates (i.e., filtering conditions or query conditions) in the Value column to a storage layer when using an Unique table implemented by the Merge-On-Read, because directly pushing down the predicates in the Value column to the storage layer may lead to incorrect results.

SUMMARY

Embodiments of the present disclosure provide a data reading method and device for a database, and a storage medium, aiming to pushing down the predicates of an LSM-Tree database in a Merge-On-Read scene.

In a first aspect, embodiments of the present disclosure provide a data reading method for a database, which includes:

receiving a query condition for a Value column in an LSM-Tree database;

querying first alternative data with Value meeting the query condition from the LSM-Tree database;

constructing a right table according to Key of the first alternative data, taking total data in the LSM-Tree database as a left table, and carrying out Semi Join based on the left table and the right table, so as to acquire second alternative data matched with each Key of the right table from the left table; and querying target data with Value meeting the query condition from the second alternative data.

In a second aspect, embodiments of the present disclosure provide a data reading device for a database, which includes:

a receiving unit which is configured to receive a query condition for a Value column in an LSM-Tree database;

a right table construction unit which is configured to query first alternative data with Value meeting the query condition from the LSM-Tree database, and construct a right table according to Key of the first alternative data;

a Semi Join unit which is configured to take total data in the LSM-Tree database as a left table, and carry out Semi Join based on the left table and the right table, so as to acquire second alternative data matched with each Key of the right table from the left table; and a result correction unit which is configured to query target data with Value meeting the query condition from the second alternative data.

In a third aspect, embodiments of the present disclosure provide an electronic device, which includes: at least one processor and a memory;

the memory stores computer executable instructions; and the at least one processor, upon executing the computer executable instructions stored in the memory, implements the data reading method for the database as described in the first aspect and various alternative implementations in the first aspect.

In a fourth aspect, embodiments of the present disclosure provide a computer-readable storage medium. The computer-readable storage medium has computer executable instructions stored thereon, and the computer executable instructions, upon executed by a processor, cause the processor to implement the data reading method for the database as described in the first aspect and various alternative implementations in the first aspect.

In a fifth aspect, embodiments of the present disclosure provide a computer program product which includes computer executable instructions, wherein the computer executable instructions, upon executed by a processor, cause the processor to implement the data reading method for the database as described in the first aspect and various alternative implementations in the first aspect.

According to the data reading method and device for a database, and the storage medium provided by the embodiments of the present disclosure, the data reading method for a database includes: receiving a query condition for a Value column in an LSM-Tree database; querying first alternative data with Value meeting the query condition from the LSM-Tree database; constructing a right table according to Key of the first alternative data, taking total data in the LSM-Tree database as a left table, and carrying out Semi Join based on the left table and the right table, so as to acquire second alternative data matched with each Key of the right table from the left table; and querying target data with Value meeting the query condition from the second alternative data. In the present disclosure, preliminary filtering is carried out based on the query condition for the Value column to narrow the range of Key, then the latest data corresponding to each Key is determined after the range is narrowed based on the Semi Join process, and finally the target data meeting the query condition in the Value column is queried from the latest data, thereby realizing predicate pushdown of the LSM-Tree database in the Merge-On-Read scene, avoiding a large number of data scanning, and taking into account the write performance and query performance.

BRIEF DESCRIPTION OF DRAWINGS

In order to provide a clearer explanation of the technical solutions in the disclosed embodiments or related art, a brief introduction will be given below to the accompanying drawings required in the embodiments or related art description. It is obvious that the accompanying drawings in the following description relate to some of the disclosed embodiments, and for those skilled in the art, other accompanying drawings can be obtained based on these drawings without inventive efforts.

FIG. 2 is a flow schematic diagram of a data reading method for a database according to embodiments of the present disclosure;

FIG. 3 is another flow schematic diagram of a data reading method for a database according to embodiments of the present disclosure;

DETAILED DESCRIPTION

In order to clarify the purpose, technical solutions, and advantages of the disclosed embodiments, the following will provide a clear and complete description of the technical solutions in the disclosed embodiments in conjunction with the accompanying drawings. Obviously, the described embodiments are a part of the disclosed embodiments, not all of them. Based on the embodiments disclosed herein, other embodiments obtained by ordinary technical personnel in this field without inventive efforts fall within the scope of protection of the present disclosure.

For an LSM-Tree database, it is difficult to push down Predicates (i.e., filtering conditions or query conditions) in a Value column to a storage layer when using a Unique table implemented by a Merge-On-Read manner, because directly pushing down the predicates in the Value column to the storage layer may lead to incorrect querying results.

The following takes one example to describe why the predicates in the Value column cannot be directly pushed to the storage layer for the LSM-Tree database using the Merge-On-Read.

Figure 1A:
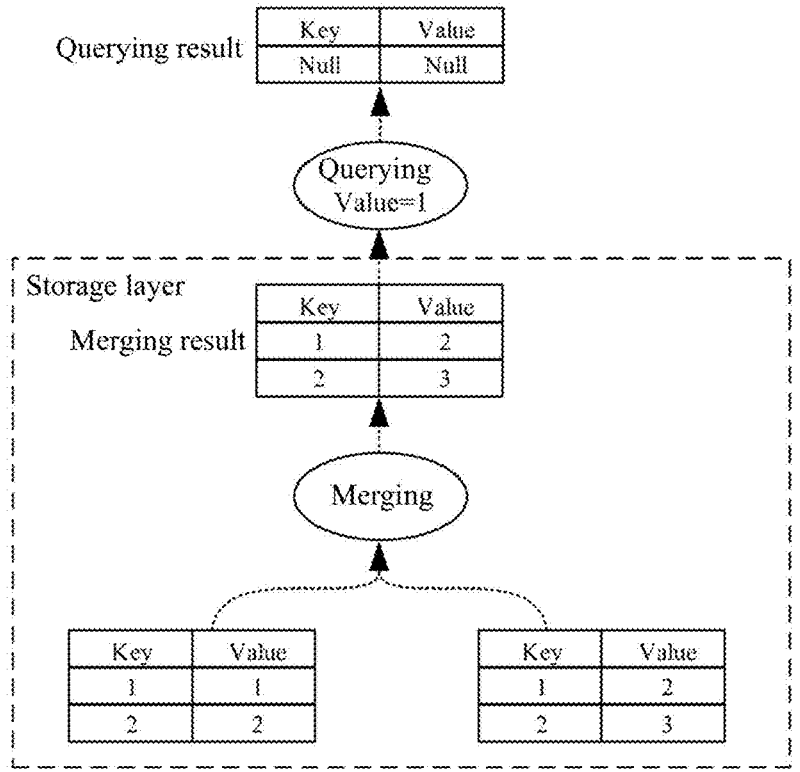
FIG. 1a is an example diagram of querying correct data from an LSM-Tree database.
Figure 1B:
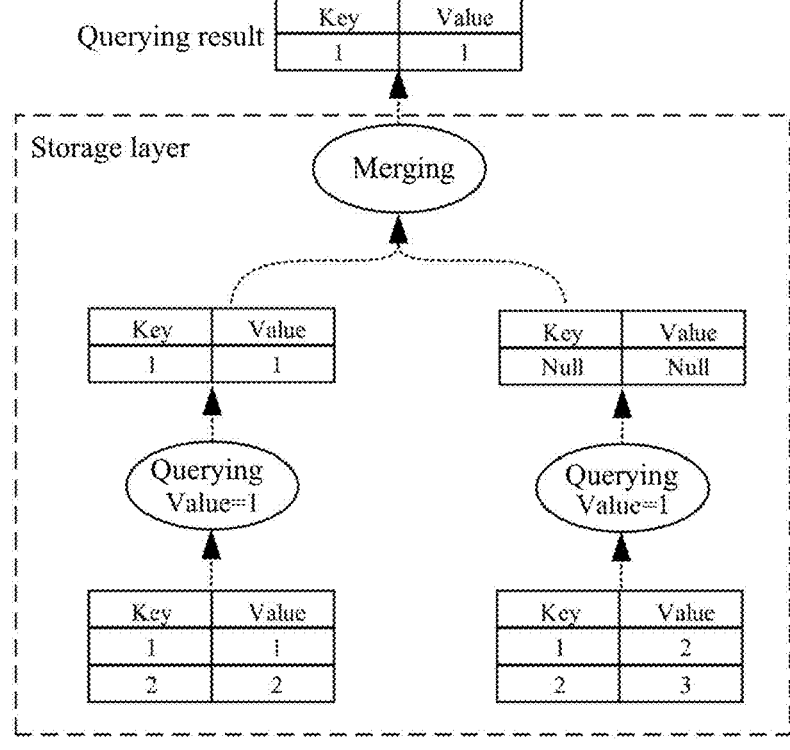
FIG. 1b is an example diagram of obtaining incorrect data in querying from an LSM-Tree database after directly performing predicate pushdown.

It is assumed that the LSM-Tree database has a Unique table which includes two columns: a Key column and a Value column; two batches of data, [(1,1), (2,2)], [(1,2), (2,3)], are sequentially written into the table, the written data are not merged, and the query condition is Value=1. FIG. 1a shows a correct data query process, in which, the data are merged firstly, then querying is conducted based on the query condition Value=1, and finally the correct result is null. As shown in FIG. 1b, the predicates (query condition) in the Value column are directly pushed down to the storage layer, thus an incorrect result (1,1) is obtained.

In order to realize that the Unique table of the LSM-Tree database supports the predicate pushdown of the Value column, the existing solutions in the industry are adjusted on the write side, for example:

Merge-On-Write: whether the corresponding Key exists and is positioned to a corresponding file is queried during data write, a delete bitmap of the corresponding file is modified, and related Key is marked with a delete identifier; its defect is that primary key index and delete bitmap are needed to be additionally maintained, and moreover, extra query and update of the delete bitmap are needed during write operation;

Copy-On-Write: all files affected by new written data are found out during data write operation, the new written data and an original file are merged, then a new version is submitted. Its defect is the write amplification is severe.

Although the above solutions can finally support predicate pushdown of the Value column, some additional costs are caused to the write side, and the performance is not friendly to a high-throughput write scene. Not modifying the write process, and directly using the Unique table of the LSM-Tree database implemented through the Merge-On-Read to support the predicate pushdown function of the Value column are not realized in the industry at present.

In order to solve above technical problem, embodiments of the present disclosure provide a data reading method for a database. The method includes: receiving a query condition for a Value column in an LSM-Tree database; querying first alternative data with Value meeting the query condition from the LSM-Tree database; constructing a right table according to Key of the first alternative data, taking total data in the LSM-Tree database as a left table, and carrying out Semi Join based on the left table and the right table, so as to acquire second alternative data matched with each Key of the right table from the left table; and querying target data with Value meeting the query condition from the second alternative data. In the present disclosure, preliminary filtering is carried out based on the query condition for the Value column to narrow the range of Key, then the latest data corresponding to each Key is determined after the range is narrowed based on the Semi Join process, and finally the target data meeting the query condition in the Value column is queried from the latest data, thereby realizing predicate pushdown of the LSM-Tree database in the Merge-On-Read scene, avoiding a large number of data scanning, and taking into account the write performance and query performance.

The data reading method for the database according to the present disclosure is described in detail in combination with specific embodiments below.

As shown in FIG. 2, it is a flow schematic diagram of a data reading method for a database according to embodiments of the present disclosure. The method according to the embodiments can be applied to a terminal or a server, and the data reading method for the database includes:

S201, receiving a query condition for a Value column in an LSM-Tree database.

In the embodiments, when a user needs to query target data with Value meeting a certain query condition (for example, the Value is equal to a certain value, or the Value is greater than or less than a certain value) from the LSM-Tree database, the query condition for the Value column can be inputted, and specifically, an SQL statement can be adopted.

S202, querying first alternative data with Value meeting the query condition from the LSM-Tree database.

In the embodiments of the present disclosure, the Value column in the LSM-Tree database is filtered based on the query condition for the Value column, so as to find out the data meeting the query condition as the first alternative data. For example, if the query condition is Value=1, the data with Value=1 is queried from the Value column in the LSM-Tree database as the first alternative data. Because there may be data with the same Key in the LSM-Tree database under the Merge-On-Read, and the Value written in advance in the data with the same Key data is invalid (it is needed to be deleted), the first alternative data queried based on the query condition for the Value column includes both the data which meets the query condition and is corresponding to the valid Value and the data which meets the query condition and is corresponding to the invalid Value.

Optionally, the indexes of Value column in an LSM-Tree database can be filtered according to query condition, so as to obtain the indexes corresponding to the first alternative data which meets the query condition; and the first alternative data is queried according to the indexes corresponding to the first alternative data.

In the embodiments of the present disclosure, when writing data into the LSM-Tree database, the index of the Value column will be established, that is, the location of the data corresponding to each Value in the database are recorded, thus, when querying the data according to the query condition for the Value column, the location of the first alternative data meeting the query condition in the database can be determined just by querying the index, and the Value column in the LSM-Tree database does not need to be read for scanning and querying, therefore, a large amount of data scanning can be avoided and the speed of querying the first alternative data can be improved.

S203, constructing a right table according to Key of the first alternative data, taking total data in the LSM-Tree database as a left table, and carrying out Semi Join based on the left table and the right table, so as to acquire second alternative data matched with each Key of the right table from the left table.

In the embodiments of the present disclosure, after the first alternative data is queried, a table can be constructed according to the Keys of the first alternative data, that is, the Keys needing to be concerned are reduced to a small range, then the table is used as a right table, and, the total data in the LSM-Tree database is used as the left table. A Semi Join is carried out based on the left table and the right table. The Semi Join is the process of matching the data in two data tables, only data associated with one data table is returned; and if one piece of data is associated with multiple pieces of data, only one result is returned. In the embodiments of the present disclosure, Semi Join is utilized to find out data matched with all keys of the right table from the left table, and if the Keys of the multiple pieces of data in the left table are matched with the same Key of the right table, only the latest data is returned, thus the latest data corresponding to each Key of the right table is acquired to serve as the second alternative data, that is, the Value in the second alternative data is the latest Value (valid Value). The right table is constructed according to the Keys of the first alternative data, the constructed right table is a superset of the Keys of a final result set (including the Keys of the target data in the final result set, and also including the Keys of some non-target data); and after Semi Join is performed, the obtained second alternative data is the latest data (valid data) of each Key of the right table, invalid data of each Key of the right table is filtered. The obtained second alternative data is also a superset of the final result set at the moment.

For example, it is assumed that the data in the LSM-Tree database is shown in Table 1 below.

TABLE 1

| Key | Value |
| --- | --- |
| 1 | 1 |
| 2 | 2 |
| 1 | 2 |
| 3 | 1 |

The first alternative data can be queried with the Value=1 query condition, as shown in Table 2 below.

TABLE 2

| Key | Value |
| --- | --- |
| 1 | 1 |
| 3 | 1 |

The right table is constructed according to the Key of the first alternative data, as shown in Table 3 below:

TABLE 3

| Key |
| --- |
| 1 |
| 3 |

After performing Semi Join based on the left table and the right table, the second alternative data is obtained as shown in Table 4 below:

TABLE 4

| Key | Value |
| --- | --- |
| 1 | 2 |
| 3 | 1 |

Optionally, in the embodiments of the present disclosure, when Semi Join is carried out based on the left table and the right table, it can be implemented based on a Runtime Filter, that is, data which cannot be hit are filtered in advance through the Runtime Filter to greatly reduce data transmission and computation in Semi Join, and therefore the overall execution time is reduced. In other words, the left table is filtered through the Runtime Filter based on each Key of the right table, then the second alternative data matched with each Key of the right table can be acquired, it is not needed to directly read all data in the left table and then match the data with the right table one by one, and therefore the Semi Join process is accelerated.

Optionally, when writing the data into the LSM-Tree database, the index of the Key column will be established, that is, the location of the data corresponding to each Key in the database will be recorded, and therefore when the left table is filtered through the Runtime Filter based on each Key of the right table, the indexes of the Key column in the LSM-Tree database is filtered through the Runtime Filter based on each Key of the right table, and then the latest index corresponding to the latest second alternative data matched with each Key of the right table can be obtained; then the second alternative data are acquired according to the index corresponding to the second alternative data. Through the index of the Key column, it is not needed to read the Key column in the LSM-Tree database for scanning and quiring, and thus, a large amount of data scanning can be avoided and the filtering speed of the Runtime Filter can be improved.

S204, querying target data with Value meeting the query condition from the second alternative data.

In the embodiments of the present disclosure, the second alternative data is a superset of the final result set. Therefore, further filtering is needed on the basis of the second candidate data. The target data with Value meeting the query condition (namely the final result set) is queried from the second alternative data based on the query condition for the Value column, in which, redundant data in the second alternative data is removed.

In the above example, for Table 4, filtering is carried out based on Value=1, so as to obtain the final target data (Key=3, Value=1).

The above process is performed in the Merge-On-Read scene, so after the target data with the Value meeting the query condition is queried from the second alternative data, it is needed to carry out an Merge operation, that is, all data with the same Key in the LSM-Tree database are merged according to Key of the target data; and therefore, only the target data is reserved in the data with the same Key (namely, the latest Value of the same Key is reserved), and the Key is ensured to uniquely correspond to one Value.

The data reading method for the database according to the embodiments of the present disclosure includes: receiving a query condition for a Value column in an LSM-Tree database; querying first alternative data with Value meeting the query condition from the LSM-Tree database; constructing a right table according to Key of the first alternative data, taking total data in the LSM-Tree database as a left table, and carrying out Semi Join based on the left table and the right table, so as to acquire second alternative data matched with each Key of the right table from the left table; and querying target data with Value meeting the query condition from the second alternative data. In the present disclosure, preliminary filtering is carried out based on the query condition for the Value column to narrow the range of Key, then the latest data corresponding to each Key is determined after the range is narrowed based on the Semi Join process, and finally the target data meeting the query condition in the Value column is queried from the latest data, thereby realizing predicate pushdown of the LSM-Tree database in the Merge-On-Read scene, avoiding a large number of data scanning, and taking into account the write performance and query performance.

On the basis of any embodiment above, before steps S202-S204 are executed, a predicate pushdown function of the Value column can be enabled and disabled. If the predicate pushdown function of the Value column is disabled, steps S202-S204 will not be executed, but a normal Merge-On-Read query process is executed, that is, a data Merge process is executed, then data query is carried out according to the query condition for the Value column, shown as ScanStep→FilterStep at the left in FIG. 3, in which, data scanning process is carried out in ScanStep, and data merge is carried out in the scanning process. Steps S202-S204 are conditionally executed only under the condition that the predicate pushdown function of the Value column is enabled, shown as the right in FIG. 3, in which, ScanStep is executed through the query condition (Value=1) for the Value column to obtain the first alternative data, the right table (RHS) is constructed according to the Key of the first alternative data, the left table (LHS) is scanned through another ScanStep, Semi Join of LHS.Key=RHS.Key is executed, and the left table (LHS) is scanned through the Runtime Filter; the second alternative data is obtained through Semi Join; and then the target data with Value meeting the query condition (Value=1) is queried from the second alternative data through the FilterStep process.

Optionally, when the user needs to enable the predicate pushdown of the Value column, a predicate pushdown enable instruction for the Value column can be transmitted, then the predicate pushdown function for the Value column can be enabled based on the predicate pushdown enable instruction for the Value column. After receiving the predicate pushdown enable instruction, the predicate pushdown function for the Value column is enabled, and a task of querying the target data from the LSM-Tree database based on the query condition for the Value column is generated, that is, the task for carrying out the steps S202-S204 is generated.

Figure 4:
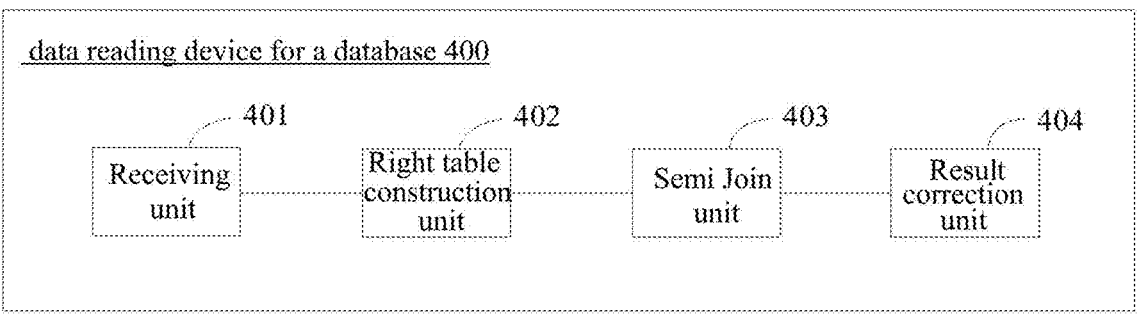
FIG. 4 is a structural block diagram of a data reading device for a database according to embodiments of the present disclosure.

In correspondence to the data reading method for the database according to the embodiments described above, FIG. 4 is a structural block diagram of a data reading device for a database according to embodiments of the present disclosure. In order to facilitate explanation, only the parts related to the data reading device of the present disclosure are described. As shown in FIG. 4, the data reading device 400 for the database includes a receiving unit 401, a right table construction unit 402, a Semi Join unit 403 and a result correction unit 404.

The receiving unit 401 is configured to receive a query condition for a Value column in an LSM-Tree database;

the right table construction unit 402 is configured to query first alternative data with Value meeting the query condition from the LSM-Tree database, and construct a right table according to Key of the first alternative data;

the Semi Join unit 403 is configured to take total data in the LSM-Tree database as a left table, and carry out Semi Join based on the left table and the right table, so as to acquire second alternative data matched with each Key of the right table from the left table; and the result correction unit 404 is configured to query target data with Value meeting the query condition from the second alternative data.

In one or more embodiments of the present disclosure, the device further includes a merge unit which is configured to: after querying the target data with Value meeting the query condition from the second alternative data, merge data with same Key in the LSM-Tree database according to Key of the target data, so as to only reserve the target data in the data with the same Key.

In one or more embodiments of the present disclosure, when querying the first alternative data with Value meeting the query condition from the LSM-Tree database, the right table construction unit 402 is configured to:

filter indexes of the Value column in the LSM-Tree database according to the query condition to obtain an index corresponding to the first alternative data which meets the query condition; and query the first alternative data according to the index corresponding to the first alternative data.

In one or more embodiments of the present disclosure, when carrying out Semi Join based on the left table and the right table, so as to acquire second alternative data matched with each Key of the right table from the left table, the Semi Join unit 403 is configured to:

filter the left table based on each Key of the right table through a Runtime Filter to acquire the second alternative data matched with each Key of the right table.

In one or more embodiments of the present disclosure, when filtering the left table based on each Key of the right table through a Runtime Filter to acquire the second alternative data matched with each Key of the right table, the Semi Join unit 403 is configured to:

filter indexes of Key column in the LSM-Tree database based on each Key of the right table through the Runtime Filter, so as to obtain the index corresponding to the latest second alternative data matched with each Key of the right table; and acquire the second alternative data according to the index corresponding to the second alternative data.

In one or more embodiments of the present disclosure, before querying first alternative data with Value meeting the query condition from the LSM-Tree database, the receiving unit 401 is further configured to:

> after receiving a predicate pushdown enable instruction for the Value column, enable the predicate pushdown function of the Value column, and generate a task of querying the target data from the LSM-Tree database based on the query condition.

The device according to the embodiments of the present disclosure can be configured to execute the technical solutions of the method embodiments descried above, the implementation principle and the technical effects are similar, and will not be repeated here.

Figure 5:
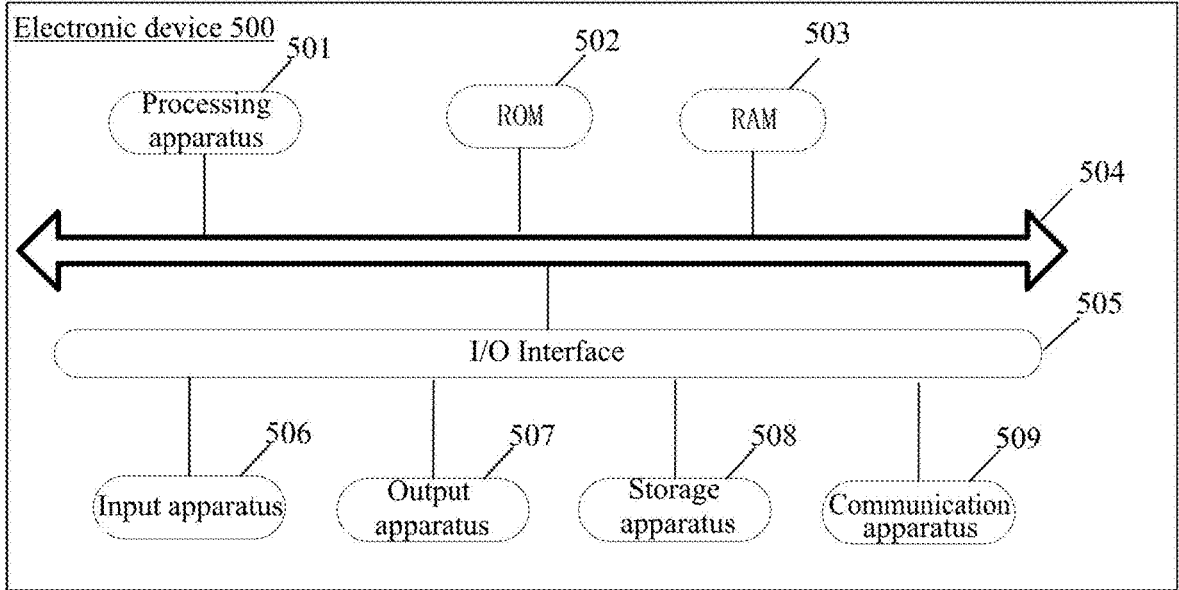
FIG. 5 is a hardware structure diagram of an electronic device according to embodiments of the present disclosure.

FIG. 5 shows a structural schematic diagram of an electronic device 500 suitable for implementing embodiments of the present disclosure. The electronic device 500 can be a terminal or a server. The terminal can include but is not limited to mobile terminals such as mobile phones, notebook computers, digital broadcast receivers, Personal Digital Assistants (PDAs), Portable Android Devices (PADs), Portable Media Players (PMPs), and vehicle-mounted terminals (such as vehicle-mounted navigation terminals), and immobile terminals such as digital TVs, and desktop computers. The electronic device shown in FIG. 5 is only an example and does not bring any limitation to the functions and the application range of the embodiments of the present disclosure.

As shown in FIG. 5, the electronic device 500 may include a processing apparatus 501 (such as a central processing unit, and a graphics processor), and can execute various proper actions and processing according to a program stored in a Read-Only Memory (ROM) 502 or a program loaded from a storage apparatus 508 into a Random Access Memory (RAM) 503. The RAM 503 stores various programs and data required by the operation of the electronic device 500. The processing apparatus 501, the ROM 502 and the RAM 503 are connected with one another through a bus 504. An input/output (I/O) interface 505 is also connected to the bus 504.

Generally, the following apparatuses can be connected to the I/O interface 505: an input apparatus 506 such as a touch screen, a touch pad, a keyboard, a mouse, a camera, a microphone, an accelerometer, and a gyroscope; an output apparatus 507 including a Liquid Crystal Display (LCD), a loudspeaker, and a vibrator; a storage apparatus 508 such as a magnetic tape, and a hard disk; and a communication apparatus 509. The communication apparatus 509 can allow the electronic device 500 to communicate with other devices in a wireless or wired manner so as to exchange data. Although FIG. 5 shows the electronic device 500 provided with various apparatuses, it is to be understood that it is not required to implement or provide all the shown apparatuses. More or less apparatuses can be implemented or provided alternatively.

Particularly, according to the embodiments of the present disclosure, the process described above with reference to the flowchart can be realized as a computer software program. For example, embodiments of the present disclosure include a computer program product, including a computer program carried on a computer-readable medium, and the computer program includes program code used for executing the method shown in the flowchart. In the embodiments, the computer program can be downloaded and installed from the network through the communication apparatus 509, or installed from the storage apparatus 508, or installed from the ROM 502. When the computer program is executed by the processing apparatus 501, the functions defined in the method according to the embodiments of the present disclosure are executed.

It is to be noted that the computer-readable medium according to the present disclosure can be a computer-readable signal medium or a computer-readable storage medium or any combination thereof. The computer-readable storage medium can be, for example, but not limited to, electric, magnetic, optical, electromagnetic, infrared or semiconductor systems, apparatuses or devices, or any combination thereof. More specific examples of the computer-readable storage medium can include, but not limited to, an electric connector with one or more wires, a portable computer magnetic disk, a hard disk, a Random Access Memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium can be any tangible medium including or storing a program, and the program can be used by an instruction execution system or apparatus or device or used in combination with them. In the present disclosure, the computer-readable signal medium may include a data signal which is transmitted in a base band or serves as a part of a carrier wave to be transmitted, and computer-readable program codes are carried in the data signal. Such transmitted data signal can be in various forms, including but not limited to, an electromagnetic signal, an optical signal, or any suitable combination thereof. The computer-readable signal medium can also be any computer-readable medium except the computer-readable storage medium, and the computer-readable signal medium can send, spread or transmit the program used by the instruction execution system, apparatus or devices, or used in combination with them. The program codes in the computer-readable medium can be transmitted through any suitable medium including, but not limited to, an electric wire, an optical cable, a Radio Frequency (RF) and the like, or any suitable combination thereof.

The computer-readable medium can be included in the electronic device and can also exist independently and is not assembled in the electronic device.

The computer-readable medium carries one or more programs, and when the one or more programs are executed by the electronic device, the electronic device executes the method shown in the above embodiments.

The computer program codes used for executing the operation in the present disclosure can be compiled by one or more programming languages or a combination thereof, and the programming languages include object-oriented programming languages such as Java, Smalltalk and C++, and also include conventional process programming languages such as a "C" language or similar programming languages. The program code can be completely executed on a user computer, partially executed on the user computer, executed as an independent software package, partially executed on the user computer and partially executed on the remote computer, or completely executed on the remote computer or the server. When involving a remote computer, the remote computer can be connected to the user computer through any type of Network, including Local Area Network (LAN) or Wide Area Network (WAN), or can be connected to an external computer (for example, the remote computer is connected through the Internet by an Internet service provider).

The flowchart and the block diagram in the accompanying drawings illustrate possibly implemented architectures, functions and operations of the systems, methods and computer program products according to various embodiments of the present disclosure. In this regard, each block in the flowchart or the block diagram can represent a module, a program segment, or a part of code, which includes one or more executable instructions for implementing a specified logical function. It is also to be noted that in some alternative embodiments, the functions marked in the blocks may also be implemented in a different order than the order marked in the accompanying drawings. For example, two blocks represented in succession can be executed substantially in parallel, and sometimes in the opposite order, depending on the function involved. It is also to be noted that each block in the block diagram and/or the flowchart and the combination of blocks in the block diagram and/or the flowchart can be implemented in a dedicated hardware-based system that executes the specified function or operation, or in a combination of dedicated hardware and computer instructions.

The units described in the embodiments of the present disclosure can be implemented in software, or in hardware. The names of the units do not in some cases form a limitation on the units, for example, the first acquisition unit can also be described as a "unit that acquires at least two Internet protocol addresses".

The functions described above can be at least partially executed by one or more hardware logic components. For example, non-limitedly, the hardware logic components of the demonstration type which can be used include: a Field Programmable Gate Array (FPGA), an Application Specific Integrated Circuit (ASIC), an Application Specific Standard Product (ASSP), a System on Chip (SOC), a Complex Programmable Logic Device (CPLD) and the like.

In the context of the present disclosure, a machine readable medium may be a tangible medium, and may include or store a program used by an instruction execution system, apparatus or device or used in combination with the instruction execution system, apparatus or device. The machine readable medium can be a machine readable signal medium or a machine readable storage medium. The machine readable medium can include but is not limited to electronic, magnetic, optical, electromagnetic, infrared or semiconductor system, apparatus or devices, or any suitable combination thereof. More specific examples of the machine readable storage medium can include an electrical connector based on one or more wires, a portable computer disk, a hard disk, a Random Access Memory (RAM), a read-only memory (ROM), an erasable programmable read-only memory (EPROM or flash memory), an optical fiber, a compact disk-readable memory (CD-ROM), an optical storage device, a magnetic storage device, or any suitable combination thereof.

In a first aspect, one or more embodiments of the present disclosure provide a data reading method for a database, including:

receiving a query condition for a Value column in an LSM-Tree database;

querying first alternative data with Value meeting the query condition from the LSM-Tree database;

constructing a right table according to Key of the first alternative data, taking total data in the LSM-Tree database as a left table, and carrying out Semi Join based on the left table and the right table, so as to acquire second alternative data matched with each Key of the right table from the left table; and querying target data with Value meeting the query condition from the second alternative data.

According to one or more embodiments of the present disclosure, after querying the target data with Value meeting the query condition from the second alternative data, the method further includes:

merging data with same Key in the LSM-Tree database according to the Key of the target data, so as to only reserve the target data in the data with the same Key.

According to one or more embodiments of the present disclosure, the querying the first alternative data with Value meeting the query condition from the LSM-Tree database includes:

filtering indexes of the Value column in the LSM-Tree database according to the query condition to obtain an index corresponding to the first alternative data which meets the query condition; and querying the first alternative data according to the index corresponding to the first alternative data.

According to one or more embodiments of the present disclosure, the carrying out Semi Join based on the left table and the right table, so as to acquire the second alternative data matched with each Key of the right table from the left table includes:

filtering the left table based on each Key of the right table through a Runtime Filter to acquire the second alternative data matched with each Key of the right table.

According to one or more embodiments of the present disclosure, the filtering the left table based on each Key of the right table through a Runtime Filter to acquire the second alternative data matched with each Key of the right table includes:

filtering indexes of Key column in the LSM-Tree database based on each Key of the right table through the Runtime Filter, so as to obtain a latest index corresponding to the second alternative data matched with each Key of the right table; and acquiring the second alternative data according to the index corresponding to the second alternative data.

According to one or more embodiments of the present disclosure, before querying the first alternative data with Value meeting the query condition from the LSM-Tree database, the method further includes:

after receiving a predicate pushdown enable instruction for the Value column, enabling a predicate pushdown function of the Value column, and generating a task of querying the target data from the LSM-Tree database based on the query condition.

In a second aspect, one or more embodiments of the present disclosure provide a data reading device for a database, including:

a receiving unit which is configured to receive a query condition for a Value column in an LSM-Tree database;

a right table construction unit which is configured to query first alternative data with Value meeting the query condition from the LSM-Tree database, and construct a right table according to Key of the first alternative data;

a Semi Join unit which is configured to take total data in the LSM-Tree database as a left table, and carry out Semi Join based on the left table and the right table, so as to acquire second alternative data matched with each Key of the right table from the left table; and a result correction unit which is configured to query target data with Value meeting the query condition from the second alternative data.

According to one or more embodiments of the present disclosure, the device further includes a merge unit which is configured to: after querying the target data with Value meeting the query condition from the second alternative data, merge data with same Key in the LSM-Tree database according to Key of the target data, so as to only reserve the target data in the data with the same Key.

In one or more embodiments of the present disclosure, when querying the first alternative data with Value meeting the query condition from the LSM-Tree database, the right table construction unit is configured to:

filter indexes of the Value column in the LSM-Tree database according to the query condition to obtain an index corresponding to the first alternative data which meets the query condition; and query the first alternative data according to the index corresponding to the first alternative data.

In one or more embodiments of the present disclosure, when carrying out Semi Join based on the left table and the right table, so as to acquire second alternative data matched with each Key of the right table from the left table, the Semi Join unit is configured to:

filter the left table based on each Key of the right table through a Runtime Filter to acquire the second alternative data matched with each Key of the right table.

In one or more embodiments of the present disclosure, when filtering the left table based on each Key of the right table through a Runtime Filter to acquire the second alternative data matched with each Key of the right table, the Semi Join unit is configured to:

filter indexes of Key column in the LSM-Tree database based on each Key of the right table through the Runtime Filter, so as to obtain a latest index corresponding to the second alternative data matched with each Key of the right table; and acquire the second alternative data according to the index corresponding to the second alternative data.

In one or more embodiments of the present disclosure, before querying the first alternative data with Value meeting the query condition from the LSM-Tree database, the receiving unit is further configured to:

after receiving a predicate pushdown enable instruction for the Value column, enable a predicate pushdown function of the Value column, and generate a task of querying the target data from the LSM-Tree database based on the query condition.

In a third aspect, embodiments of the present disclosure provide an electronic device, which includes: at least one processor and a memory;

the memory stores computer executable instructions; and the at least one processor, upon executing the computer executable instructions stored in the memory, implements the data reading method for the database as described in the first aspect and various alternative implementations in the first aspect.

In a fourth aspect, embodiments of the present disclosure provide a computer-readable storage medium. The computer-readable storage medium has computer executable instructions stored thereon, and the computer executable instructions, upon executed by a processor, cause the processor to implement the data reading method for the database as described in the first aspect and various alternative implementations in the first aspect.

In a fifth aspect, embodiments of the present disclosure provide a computer program product which includes computer executable instructions, wherein the computer executable instructions, upon executed by a processor, cause the processor to implement the data reading method for the database as described in the first aspect and various alternative implementations in the first aspect.

The above description is only for the preferred embodiments disclosed in the present disclosure and explanations of the technical principles used. Technicians in this field should understand that the scope of disclosure referred to in this disclosure is not limited to technical solutions formed by specific combinations of the aforementioned technical features, and should also cover other technical solutions formed by arbitrary combinations of the aforementioned technical features or their equivalent features without departing from the disclosed concept. For example, a technical solution formed by replacing the above features with (but not limited to) technical features with similar functions disclosed in the present disclosure.

Furthermore, although the operations are depicted in a specific order, this should not be understood as requiring them to be executed in the specific order shown or in sequential order. In certain environments, multitasking and parallel processing may be advantageous. Similarly, although several specific implementation details are included in the above discussion, these should not be interpreted as limitations on the scope of the present disclosure. Some features described in the context of individual embodiments can also be combined to be implemented in a single embodiment. On the contrary, various features described in the context of a single embodiment can also be implemented separately or in any suitable sub-combination in multiple embodiments.

Although the subject matter has been described in language specific to structural features and/or method logical actions, it should be understood that the subject matter limited in the attached claims may not necessarily be limited to the specific features or operations described above. On the contrary, the specific features and operations described above are only exemplary forms of implementing the claims.

What is claimed is:

1. A method for improving query efficiency in a log-structured merge-tree (LSM-Tree) database, comprising:

receiving a query condition for a Value column of the LSM-Tree database;

switching a predicate pushdown of the Value column from a disabled state to an enabled state in response to receiving an instruction;

querying first key-value pairs in the LSM-Tree database whose values meet the query condition in response to determining that the predicate pushdown of the Value column is in the enabled state, wherein keys of the first key-value pairs fall within a restricted key range of a Key column associated with the Value column;

carrying out Semi Join based on total data in the LSM-Tree database and the first key-value pairs to acquire second key-value pairs, wherein keys of the second key-value pairs are identical to the keys of the first key-value pairs, and wherein values of the second key-value pairs comprise latest data corresponding to each of the keys; and querying target key-value pairs whose values meet the query condition from the second key-value pairs instead of from the total data in the LSM-Tree database to reduce data scanning, thereby improving the query efficiency.

2. The method of claim 1, wherein after querying the target key-value pairs whose values meet the query condition from the second key-value pairs, the method further comprises:

merging data with same Key in the LSM-Tree database according to Keys of the target key-value pairs, so as to only reserve the target key-value pairs.

3. The method of claim 1, wherein the querying the first key-value pairs in the LSM-Tree database whose values meet the query condition comprises:

filtering indexes of the Value column in the LSM-Tree database according to the query condition to obtain an index corresponding to the first key-value pairs; and querying the first key-value pairs according to the index.

4. The method of claim 1, wherein the carrying out Semi Join based on total data in the LSM-Tree database and the first key-value pairs to acquire second key-value pairs comprises:

filtering the total data in the LSM-Tree database based on each of the keys of the first key-value pairs through a Runtime Filter to acquire the second key-value pairs.

5. The method of claim 4, wherein the filtering the total data in the LSM-Tree database based on each of the keys of the first key-value pairs through a Runtime Filter to acquire the second key-value pairs comprises:

filtering indexes of the Key column based on each of the keys of the first key-value pairs through the Runtime Filter, so as to obtain a latest index corresponding to the second key-value pairs matched with each of the keys of the first key-value pairs; and acquiring the second key-value pairs according to the index.

6. The method of claim 1, wherein before querying the first key-value pairs in the LSM-Tree database whose values meet the query condition, the method further comprises:

after receiving the instruction, enabling a predicate pushdown function of the Value column, and generating a task of querying the target key-value pairs from the LSM-Tree database based on the query condition.

7. An electronic device, comprising: a processor and a non-transitory memory; the memory stores computer executable instructions; and wherein the computer executable instructions upon execution by the processor, cause the processor to:

receive a query condition for a Value column of a log-structured merge-tree (LSM-Tree) database;

switching a predicate pushdown of the Value column from a disabled state to an enabled state in response to receiving an instruction;

query first key-value pairs in the LSM-Tree database whose values meet the query condition in response to determining that the predicate pushdown of the Value column is in the enabled state, wherein keys of the first key-value pairs fall within a restricted key range of a Key column associated with the Value column;

carry out Semi Join based on total data in the LSM-Tree database and the first key-value pairs to acquire second key-value pairs, wherein keys of the second key-value pairs are identical to the keys of the first key-value pairs, and wherein values of the second key-value pairs comprise latest data corresponding to each of the keys; and query target key-value pairs whose values meet the query condition from the second key-value pairs instead of from the total data in the LSM-Tree database to reduce data scanning, thereby improving the query efficiency.

8. The electronic device of claim 7, wherein after querying the target key-value pairs whose values meet the query condition from the second key-value pairs, the computer executable instructions further cause the processor to:

merge data with same Key in the LSM-Tree database according to Keys of the target key-value pairs, so as to only reserve the target key-value pairs.

9. The electronic device of claim 7, wherein the querying the first key-value pairs in the LSM-Tree database whose values meet the query condition comprises:

filtering indexes of the Value column in the LSM-Tree database according to the query condition to obtain an index corresponding to the first key-value pairs; and querying the first key-value pairs according to the index.

10. The electronic device of claim 7, wherein the carrying out Semi Join based on total data in the LSM-Tree database and the first key-value pairs to acquire second key-value pairs comprises:

filtering the total data in the LSM-Tree database based on each of the keys of the first key-value pairs through a Runtime Filter to acquire the second key-value pairs.

11. The electronic device of claim 10, wherein the filtering the total data in the LSM-Tree database based on each of the keys of the first key-value pairs through a Runtime Filter to acquire the second key-value pairs comprises:

filtering indexes of the Key column based on each of the keys of the first key-value pairs through the Runtime Filter, so as to obtain a latest index corresponding to the second key-value pairs matched with each of the keys of the first key-value pairs; and acquiring the second key-value pairs according to the index.

12. The electronic device of claim 7, wherein before querying the first key-value pairs in the LSM-Tree database whose values meet the query condition, the computer executable instructions further cause the processor to:

after receiving the instruction, enabling a predicate pushdown function of the Value column, and generating a task of querying the target key-value pairs from the LSM-Tree database based on the query condition.

13. A non-transitory computer-readable storage medium storing computer executable instructions that cause the processor to:

receive a query condition for a Value column of a log-structured merge-tree (LSM-Tree) database;

switch a predicate pushdown of the Value column from a disabled state to an enabled state in response to receiving an instruction;

query first key-value pairs in the LSM-Tree database whose values meet the query condition in response to determining that the predicate pushdown of the Value column is in the enabled state, wherein keys of the first key-value pairs fall within a restricted key range of a Key column associated with the Value column;

carry out Semi Join based on total data in the LSM-Tree database and the first key-value pairs to acquire second key-value pairs, wherein keys of the second key-value pairs are identical to the keys of the first key-value pairs, and wherein values of the second key-value pairs comprise latest data corresponding to each of the keys; and query target key-value pairs whose values meet the query condition from the second key-value pairs instead of from the total data in the LSM-Tree database to reduce data scanning, thereby improving the query efficiency.

14. The non-transitory computer-readable storage medium of claim 13, wherein after querying the target key-value pairs whose values meet the query condition from the second key-value pairs, the computer executable instructions further cause the processor to:

merge data with same Key in the LSM-Tree database according to Keys of the target key-value pairs, so as to only reserve the target key-value pairs.

15. The non-transitory computer-readable storage medium of claim 13, wherein the querying the first key-value pairs in the LSM-Tree database whose values meet the query condition comprises:

filtering indexes of the Value column in the LSM-Tree database according to the query condition to obtain an index corresponding to the first key-value pairs; and querying the first key-value pairs according to the index.

16. The non-transitory computer-readable storage medium of claim 13, wherein the carrying out Semi Join based on total data in the LSM-Tree database and the first key-value pairs to acquire second key-value pairs comprises:

filtering the total data in the LSM-Tree database based on each of the keys of the first key-value pairs through a Runtime Filter to acquire the second key-value pairs.

17. The non-transitory computer-readable storage medium of claim 16, wherein the filtering the total data in the LSM-Tree database based on each of the keys of the first key-value pairs through a Runtime Filter to acquire the second key-value pairs comprises:

filtering indexes of the Key column based on each of the keys of the first key-value pairs through the Runtime Filter, so as to obtain a latest index corresponding to the second key-value pairs matched with each of the keys of the first key-value pairs; and acquiring the second key-value pairs according to the index.

18. The non-transitory computer-readable storage medium of claim 13, wherein before querying the first key-value pairs in the LSM-Tree database whose values meet the query condition, the computer executable instructions further cause the processor to:

after receiving the instruction, enabling a predicate push-down function of the Value column, and generating a task of querying the target key-value pairs from the LSM-Tree database based on the query condition.

* * * * *